United States Patent [19]

Faaborg

[11] Patent Number: 4,608,917
[45] Date of Patent: Sep. 2, 1986

[54] STOVE TOP BROILER COMBINATION

[76] Inventor: Paul G. Faaborg, 5580 Wood Valley Dr., Haslett, Mich. 48840

[21] Appl. No.: 718,350

[22] Filed: Apr. 1, 1985

[51] Int. Cl.$^4$ ............................................. A47J 37/06
[52] U.S. Cl. ........................................ 99/340; 99/400; 99/425; 99/445; 99/446; 99/450
[58] Field of Search ................. 99/340, 444, 445, 446, 99/400, 425, 450; 426/523

[56] References Cited

U.S. PATENT DOCUMENTS

| | | |
|---|---|---|
| 1,176,720 | 3/1916 | Varian . |
| 2,180,868 | 11/1939 | Dunning ............................ 99/444 X |
| 2,884,849 | 5/1959 | Priem ................................... 99/444 |
| 2,940,381 | 6/1960 | Cottongim ........................... 99/445 |
| 3,008,406 | 11/1961 | Reeves .............................. 99/340 X |
| 3,369,481 | 2/1968 | Pappas ............................. 99/446 X |
| 3,422,746 | 1/1969 | Sheinker ............................ 99/445 |
| 3,443,510 | 5/1969 | Norton ................................ 99/445 |
| 3,842,726 | 10/1974 | Fautz ............................... 99/445 X |
| 3,946,651 | 3/1976 | Garcia ................................ 99/444 |

FOREIGN PATENT DOCUMENTS

| | | | |
|---|---|---|---|
| 129109 | 9/1948 | Australia ............................. 99/445 |
| 0099551 | 2/1984 | European Pat. Off. ............. 99/445 |
| 2427678 | 12/1975 | Fed. Rep. of Germany ........ 99/445 |
| 3969 | 5/1896 | United Kingdom ................. 99/445 |
| 459764 | 1/1937 | United Kingdom ................. 99/446 |

Primary Examiner—Billy J. Wilhite
Attorney, Agent, or Firm—Miller, Morriss & Pappas

[57] ABSTRACT

Combination stove top broiler and griddle in simplified structural form easily dismantled and cleanable providing simple geometric shapes with a minimum number of tight corners and crevices and including means to drain grease and scrape debris. The broiler surface comprises a plurality of simple angles opened upwardly and on a tilted bed draining to a removable trough via a slanted lip and including support means for a drop-in griddle top conversion using the same frame module as a base.

4 Claims, 8 Drawing Figures

STOVE TOP BROILER COMBINATION

The present invention is directed to a new, useful and inventive stove top broiler and griddle combination. A base forms an open-bottomed and open-topped rectangular enclosure and selectively receives a griddle or broiler surface mountable in the top of the base or frame. The broiler grill is made up of plural elongate angles secured in parallel spaced-apart adjacent relationship and supported across the top of the base in a drain-slant position. Beneath the removable broiler and griddle are plural larger angles removably supported by notched support plates. The support plates are in horizontal relation spanning across the base. The larger angles are positioned with their legs opened at the top and the larger elongate angles run substantially from the front to the back of the base. The front of the base is characterized by the inclusion of a drip lip across the face of the base and slanted outwardly and downwardly forming a flange for guiding drip and for positioning and supporting a trough or pan. Provision is made for supporting the grill or broiler cooking surface in a slant position so that the smaller angles drain forwardly over the lip and into the drain cup or pan and so that various cooking temperatures can be selected. The one-piece griddle plate drops into a horizontal position upon removal of the grill or broiler surface to accommodate use of the structure as a stove top griddle when desired. Support for the griddle is within the base.

The stove top broiler combination is used to place directly on the top of a range or stove, especially of the restaurant range type, and converts the range at minimum costs to a charbroiler or griddle within minutes. It is easily used and maintained and little or no clean-up is required. The grease drain trough or pan is easily removable. The unit pre-heats within minutes and the angles forming the broiler grill surface-brand the steak or meat in selected parallel lines of contact. The pitch or slanted grid allows selection of cooking speeds. The flat top griddle conversion adds another dimension of usefulness to the combination and the conversion of the range to griddle avoids the necessity for acquiring special broiler or griddle units. Charcoal broiling is achieved and the flavor of cooked meat is enhanced by the horizontal lower level larger angles which burn and vaporize the drip falling between the grids of the broiler.

Accordingly, the principal object of the present invention is to provide a stove top broiler combination that converts existing ranges to new usefulness in a very short time.

Another object is to provide a broiler combination which is easy to clean and generates outdoor flavored meat with selected hickory, charcoal and mesquite flavor options within the kitchen.

Another object is to provide an easily stored combination broiler that is economical to install using existing exhaust hoods and burners.

Other objects will be apparent to those familiar in the cooking arts as the description proceeds.

BACKGROUND

Broilers and griddles built into stoves and used in combination over open fires are known to be old. The closest structures known by the inventor to be closest to the present structure are found in the U.S. Pat. No. 1,176,720 to H. L. Varian for a Broiler Plate and the structure of J. H. Garcia for a Broiler in the U.S. Pat. No. 3,946,651. The former is a pan-like circular structure which includes a grill surface plate in the form of a cast bottom having raised ribs, a slanted surface established by integral legs which engage the top of a range, especially gas burners. The lower portion of the slanted surface includes a circular opening through which grease and juices can flow. The latter work of Garcia is a stepped enclosure having a horizontal upper grill surface and at least two baffle plates below the grill which rest on the plates and include staggered slots so as to prevent grease and juices from falling to the stove top or open flame. As will be appreciated, the invention claimed herein represents a new, useful and inventive broiler-griddle combination reaching beyond the closest referenced work.

In the present device, simple structural shapes in the form of slanted angles provide an excellent broiler surface and the second set of larger angles beneath the cooking surface provide excellent heat permeation from the heat source and are positioned to burn off and destroy the grease and juices reaching those surfaces from the upper cooling surface. Additives such as charcoal, wood chips and mesquite chips are easily sprinkled over the lower horizontal angles to impart selected flavor to meats cooking on the grill or broiler surface. In cleaning, the break down of the structure is easily achieved for access to all surfaces and crevices. The device stores within its own base.

IN THE DRAWINGS

GENERAL DESCRIPTION

In general, an open-topped and open-bottomed rectangular base is provided and the base, at one end, includes a drain lip beneath the level of the upper surface of the base extending fully across the end of the broiler surface and the lip is slanted forwardly and downwardly, as will be seen, and in drop offset relation to the front face of the base. The base includes a pair of spaced-apart notched supports which span across the open bottom. A plurality of elongate larger legged angles nest in the notches and form horizontal spaced-apart grooved rails which open upwardly. The broiler surface is made up of plural adjacent parallel elongate smaller angles than the larger angles and the legs of the angles forming the surface are upturned and are secured together in a rigid parallel pattern by support bars secured as by welding to the spines of the plural angles at the joinder of the right angle legs of the smaller angles. Brackets are provided in the base supporting the broiler surface in a slant attitude toward the front lip and the broiler surface rests on the lip at an angle substantially equal to the angle of slant. A drain trough is provided which reaches beyond the lip and which includes a rear splash flange which inserts under the front edge of the lip to secure the trough in position and catch grease and debris draining from the broiling or cooking surface.

By removing the broiling surface and nestably inserting the griddle surface, the cooking surface of the combination structure is made level and flat with drainage means across the front in coordination with the lip and drainage trough. This conversion is quickly achieved making a fast transition from breakfast griddle usage to an afternoon charbroil menu.

The resultant structure is economical to construct, simple to maintain and extends a conversion unit to broiler and griddle at a substantial savings to restauranteurs desiring to include those means of cooking without expansion of existing stove space and without the need for special stoves. Used with charcoal and hickory or mesquite chips, the flavor of meat is materially upgraded without special equipment and facilities.

SPECIFIC DESCRIPTION

Figure 1:
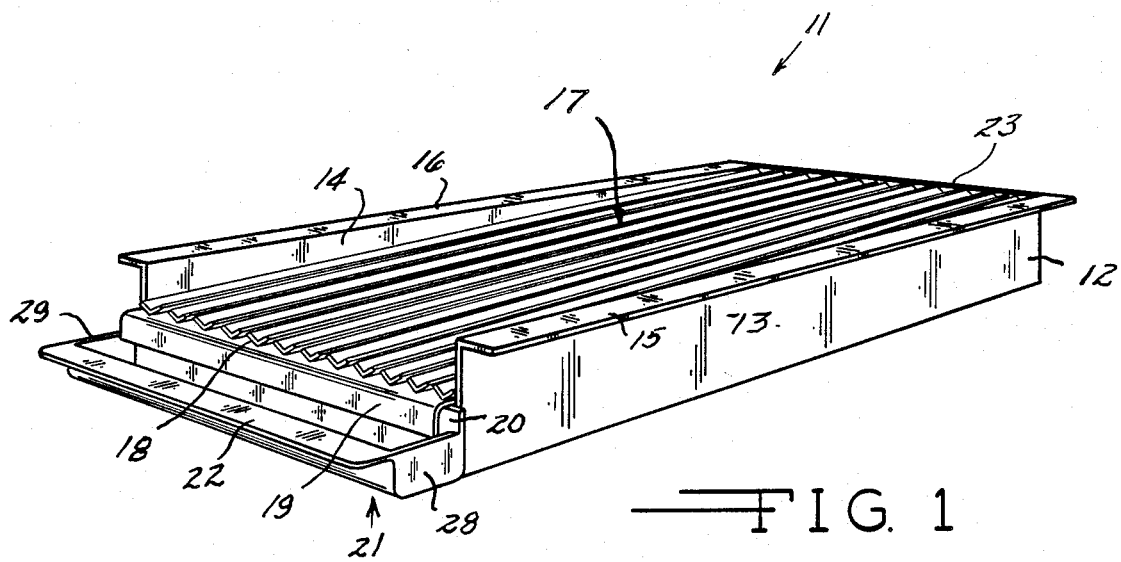
FIG. 1 is a perspective view of the present invention fully assembled in broiling attitude for placing over a heat source such as found on a range top or stove.

Referring to the drawings and with first reference to the FIG. 1, the stove top broiler combination apparatus 11 is represented in assembled form as it would be placed on a stove, range top (not shown), or over an open fire. The base element 12 forms a rectangular enclosure, as will be appreciated. There are two vertical parallel spaced-apart sides 13 and 14 which include horizontally disposed top flanges 15 and 16 service as convenient handles. By means of these flanges 15 and 16, the entire combination or the base 12 can be easily lifted on or off of a range surface, for example. Transversely between the two sides 13 and 14, a broiler surface 17 is nestably supported. The surface 17 is slanted or tilted downwardly toward the front of the structure 11 and the front end 18 of the surface 17 rests on the drainage lip 19 which rolls forwardly from the top of the front panel of the base 12 and in spaced relation thereto so as to allow the lip 19 to grip the splash flange 20 of the drain trough or cup 21 which extends across the front of the broiler combination 11. The lip 19 comprises a two-legged rolled piece of metal welded to the sides 13 and 14 extending across the top edge of the front plate or wall. This construction will be better understood as the description proceeds. The forward extending flange 22 provides a smooth and simple handling surface for the trough 21 in facilitating removal and connection of the trough 21. The rear panel or wall 23 of the base 12 is at the same height as the sides 13 and 14. The broiler surface 17 includes a plurality of elongate small angles 24 in parallel spaced-apart relation. The angles 24 are rigidly secured, as by welding, to support bars (not shown in FIG. 1) beneath the angles 24 and engaging and welded to the downwardly pointed spine portions of the angles 24. The open flared legs of the angles 24 are uppermost, as shown, and provide edges that neatly brand meat placed on the surface 17 at broiling heat. The broiler surface 17 of angles 24 and bars, as will be seen, can be lifted out of the nested arrangement shown. The base 12, as described, is open at the bottom and at the top to the circulation of air and heat therethrough. The bottom is level so as to rest flat on a range top over selected burners or selected heat sources. All described parts are fabricated from steel having a thickness of about 3/32 inches in the base 12 and about 1/16 inches in the stock of the trough 21. The angles 24 have legs about ½ inches in length and leg stock thickness is about 3/32 inches. The support bars are from steel rod stock having a diameter of about ½ inches. The preferred spacing interval between adjacent ends of the legs of the angles 24 is about ⅜ inches. The slant of the surface 17 is between about four to eight degrees from horizontal.

Figure 2:
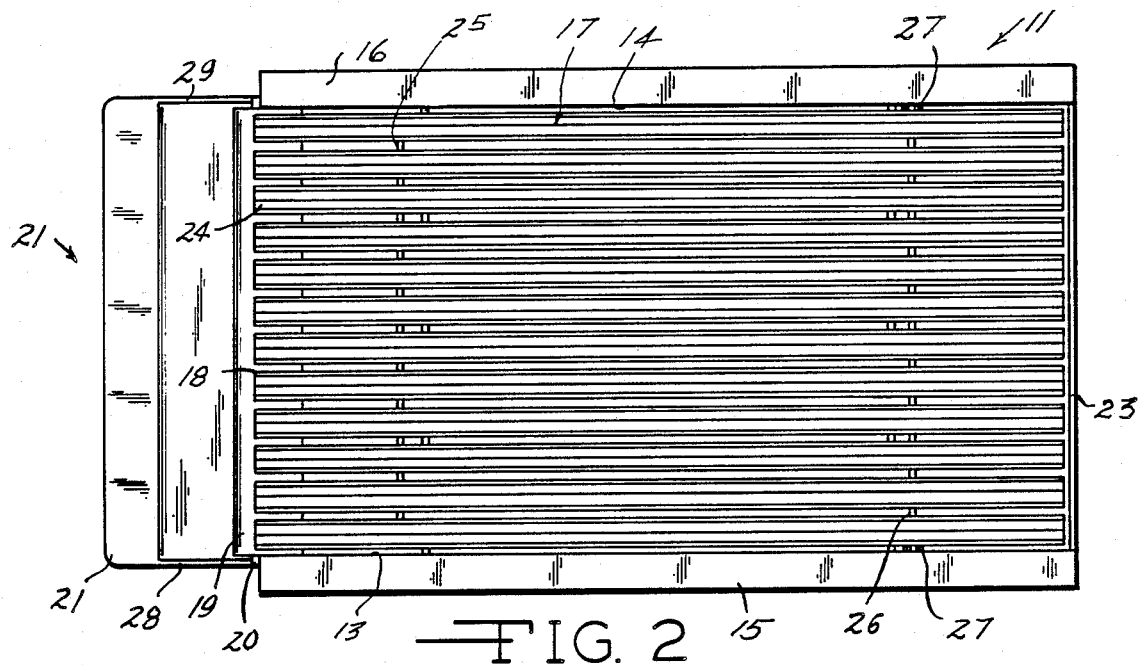
FIG. 2 is a top plan view of the structure shown in FIG. 1.

In FIG. 2, the locating of the support bars 25 and 26 can best be appreciated in support of the smaller angles 24. The rearmost bar 26 rests at its ends in the spaced-apart top opening brackets 27 welded in facing relation on the inner faces of walls 13 and 14. The end closures 28 and 29 of the trough 21 can also be better appreciated.

Figure 3:
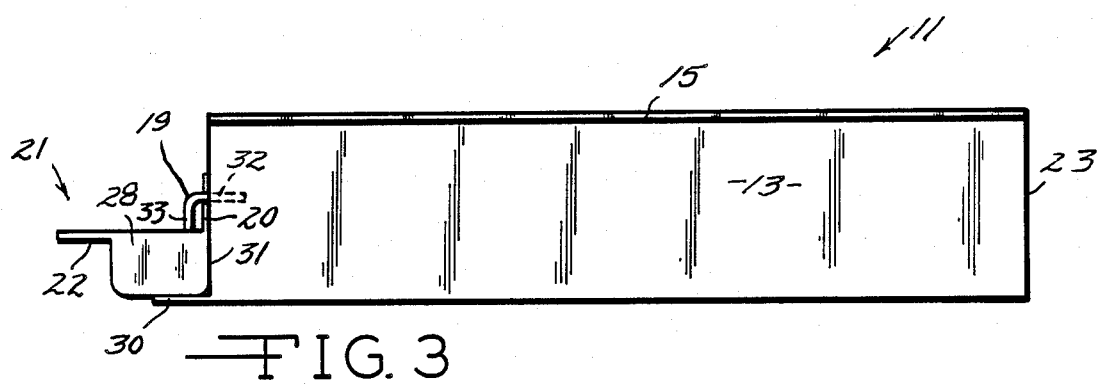
FIG. 3 is a side elevation view of the broiler shown in FIG. 2.

In FIG. 3, the trough 21 is best seen resting on the horizontally extended flange 30 and the flange 30 is an extension of the vertical front wall 31 between the sides 13 and 14 and is capped by the lip 19. The upper face 32 of the lip 19 generally imitates the slant angle of the broiler surface 17 and the front edge 18 of the broiler surface 17 rests on the slanted surface of face 32. The splash flange 20 of the trough 21 is shown secured by the downturned portion 33 of the lip 19. The lip 19 delivers juices and grease into the trough or cup 21 and engages the inner parts of the end plates 28 and 29 thereby stabilizing the trough 21 against chance dislodgement.

Figure 4:
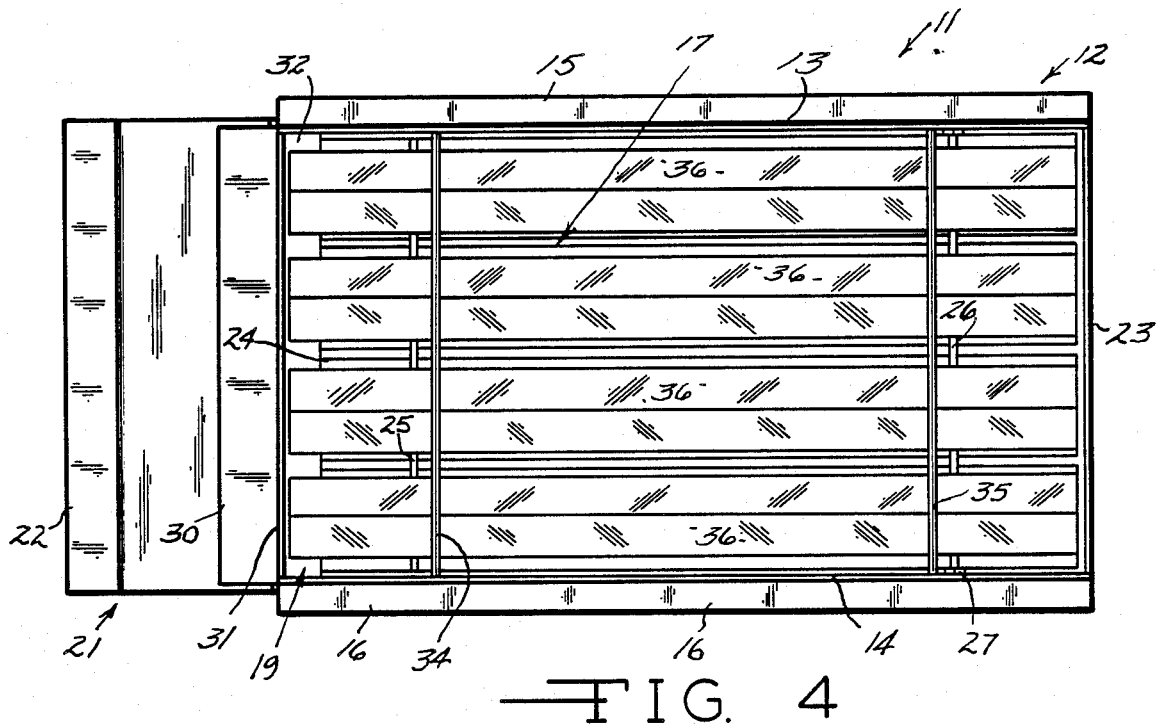
FIG. 4 is a bottom plan view of the broiler structure shown in FIGS. 1, 2 and 3.

The FIG. 4 provides a bottom view of the broiler combination 11 to reveal the transverse supports 34 and 35 which, as will be seen, are notched to removably support the plural larger (larger than the angles 24) elongate angles 36 (one and one-half inch legs) horizontally beneath the broiler surface 17. Here it can be seen that the broiler surface 17 rests the ends 18 (FIG. 1) of the small angles 24 on the surface 32 of the lip 19 and at the rear in the brackets 27 which receive the rod 26 and thereby establish the fixed slant seen in FIG. 1. Further, the bottom flange or foot 30 beneath the trough 21 is best visible as an extension from the front wall 31.

Figures 5, 6:
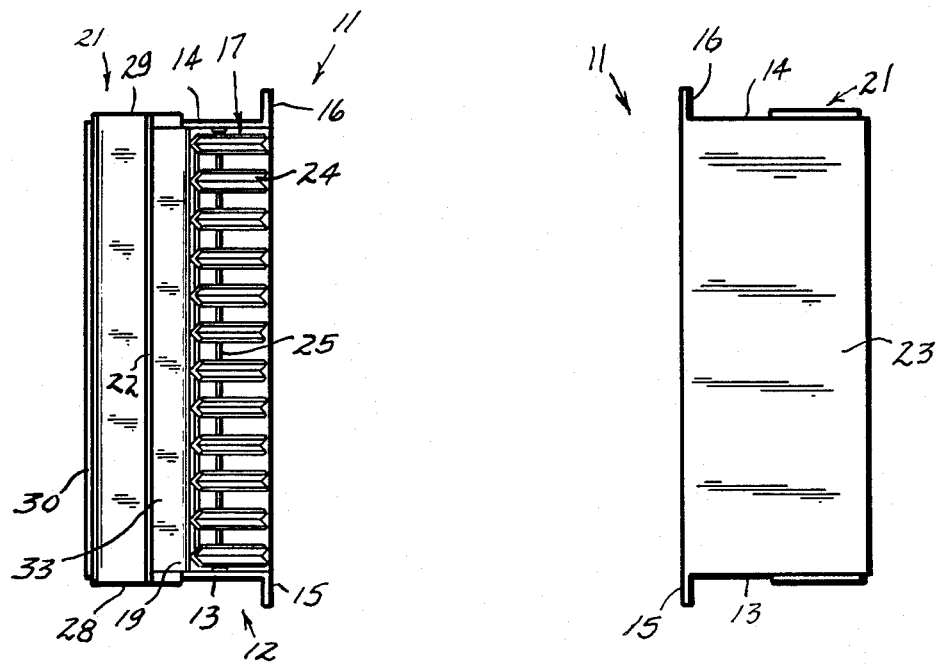
FIG. 5 is an end elevation view of the present invention showing the front end with the grease trough in position and the grill surface across the top.
FIG. 6 is a rear end elevation of the invention shown in FIGS. 1, 2, 3, 4 and 5.

FIG. 5 provides a front view of the broiler combination 11 tipped up on the side 13 and better describes the retention of the trough 21 in respect to the depending portion 33 of the lip 19 and the orientation of the smaller angles 24 in the broiler surface 17, open at the top with groove down, is best appreciated. The flange or foot 30 is beneath the trough 21.

FIG. 6 is a rear elevation making the rear vertical wall 23 fully visible and the slight overhang of the trough 21 can be understood.

Figure 7:
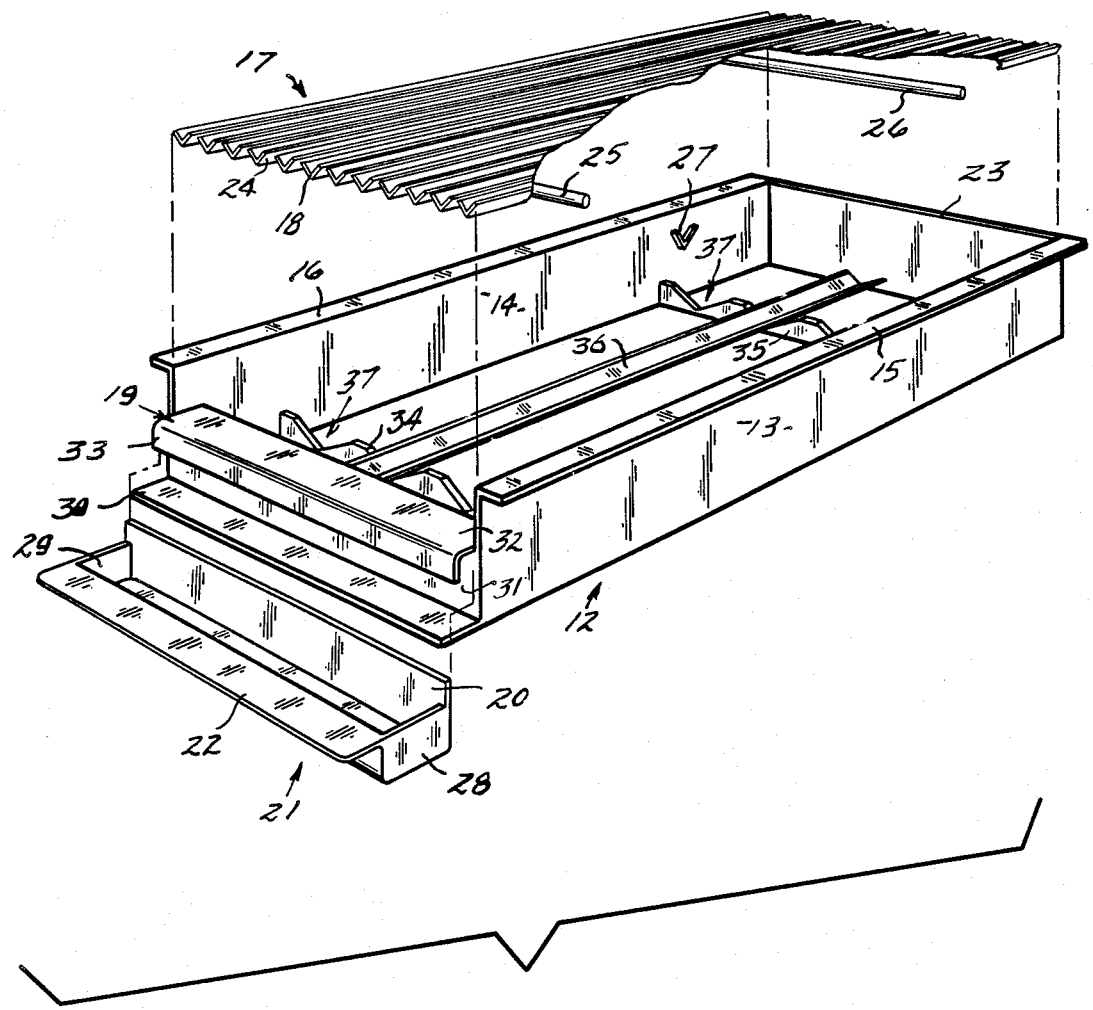
FIG. 7 is an exploded and partially cutaway perspective view of the inventive structure and indicating the economy of parts, the ease of construction and assembly and suggesting the ease of disassembly for cleaning.

FIG. 7 is indicative of the ease of assembly and disassembly of the broiler combination 11 and the spanning or transverse notched supports 34 and 35 are visible holding the plural larger angles 36 in an orientation to substantially interfere with vertically falling grease and debris from the broiler or cooking surface 17. These angles 36 assist in retention of even heat and capture of such additives as wood chips and mesquite chips for flavoring the cooking. The notches 37 in the supports 34 and 35 retain the angles 36 removably in parallel spaced-apart adjacent relation. The elongate angles 36 are spaced-apart about 5/8 inches. The rear support bar 26 forming a part of broiler surface 17 will be appreciated as indexing removably in the notched bracket 27 projecting into the enclosure of the base 12. The notches of the brackets 27 are open at the top, as shown, and allow the broiler surface 17 to drop into the base 12 between the perimeter walls 13, 14, 23 and 31 resting on the upper surface 32 of the lip 19 and draining to the trough 21 which is easily removed and securely retained against chance dislodgement.

In use, the base or enclosure 12 is placed on the stove top over burners or heat sources (not shown) and the larger angles 36 are dropped into position in the notches 37 of the planar supports 34 and 35. The supports 34 and 35 are welded in place at their ends against the walls 13 and 14. In this manner, the angles 36 extend for the length of the enclosure formed by base 12 but gapped, as indicated. Then the broiler surface 17 is dropped into position secure in the brackets 27 and resting on the lip 19 and especially the upper slanted surface 32 thereof. The trough 21 is engaged below the downturned portion 33 of the lip 19 and the broiler combination 11 is ready to use when heated. The plenum formed by the open-bottomed and open-topped enclosure base 12 confines and concentrates heat moving upwardly through, around and between the larger and smaller angles 36 and 24. All surfaces quickly reach and sustain even broiling or cooking temperatures. Meat placed on the broiler surface 17 is branded where the legs of the angles 24 sear into the meat at contact and the juices and grease falling from the meat drains in the channels formed by the small angles 24 to the trough 21 or drop through the gaps between the angles 24 to vaporize or impinge on the lower horizontal bank of larger angles 36. This substantially captures all debris and grease and the resultant vapors rising with the heat flavor the meat in a most pleasing way. This substantially avoids flash grease fires and permits the use and addition of charcoal, hickory or mesquite chips in the enclosure which permeate the meat as the wood chips are consumed. The meat scent and flavors are delightful and the slant, while complementing draining off of debris and grease, allows selective positioning of the meat for higher or lower temperature cooking. The combination structure brings high quality broiling to the average restaurant without the expense and space of separate cooking means and controls therefor. As the meat is turned 90 degrees the seared stripes on the meat are positioned to intersect each other in a characteristic haute cuisine manner.

Figure 8:
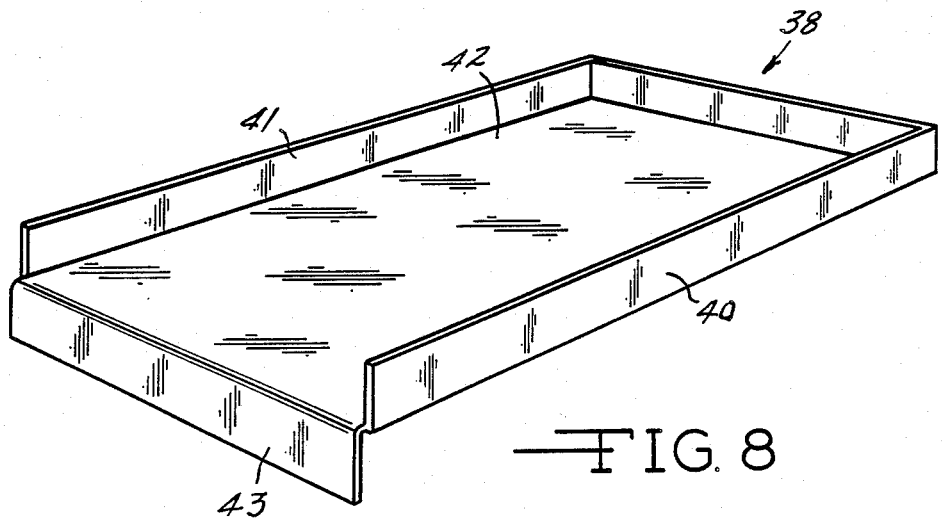
FIG. 8 is a perspective view of a griddle insertable in place of the broiler surface and nestable in the same base.

By reference to FIG. 8, a one-piece griddle 38 is indicated. Two vertical welds joint the upturned rear wall 39 and side walls 40 and 41 to provide a partially confined flat cooking surface 42 having a front downturned leg 43, as shown. The griddle 38 replaces the broiler surface 17 nestably inserted in the top of the base 18, as described. The flat bottom 42 rests in a secure, level position against the brackets 27 and at an elevation established by the downwardly rolled leg 43 resting against the lip 19. Accordingly, the griddle 38 is easily scraped and drained into the trough 21 and utilizes the same heat sources to operate the griddle as for operation of the broiler surface 17. Thus, the structure described is portable as to utility and adaptable to two cooking modes upon selected assembly.

Trough 21 is a one-piece metal structure with sharp edges removed and utilizing internal weld filleting and curves to provide minimal traps for dirt, grease and scale. This is also true of the cooking surfaces 17 and 38 and is also apparent in the larger angles which include a rolled, filleted groove for simple scraping and scrubbing. The base is wholly open providing access to cleaning implements and scrubbing.

Finally, the broiler combination 11 easily stores its parts in the rectangular enclosure of the base 12 minimizing the need for storage space and clutter.

The units 11 are sized to adapt to one or plural burners and the steel, as used, is selected in avoidance of heat distortion and corrosion under simple cleaning procedures. The best cleaner is a simple steel brush and a detergent bath.

Having thus described my invention and the preferred embodiment thereof, those skilled in the art will readily perceive improvements, changes and modifications. Such improvements, changes and modifications are intended to be included within the spirit of the invention, limited only by the scope of my hereinafter appended claims.

I claim:

1. A combination structure selectively supporting a broiler and a griddle comprising:

an open-topped and open-bottomed rectangular base forming an upper level parallel to a lower rest level of said base;

a downturned drain flange across one end of said base at an elevation below the upper level of said base;

a pair of spaced-apart notched supports spanning said open bottom;

a plurality of elongate structural angles having upturned legs for support of debris and chips for burning and flavor additives nestable and removable from the notches in said supports and said legs of said angles forming horizontal spaced-apart grooved rails terminating substantially against walls of said base;

a one-piece selectively removable broiler surface having plural adjacent parallel elongate spaced-apart smaller structural angles, each of said smaller structural angles having upturned legs, and above said first recited structural angles, and said smaller angles retained in a rigid pattern by support bars secured to the said plural smaller angles at the juncture of the said legs of said smaller angles;

brackets in said base supporting said broiler surface and selectively supportive of a griddle in a slant attitude downwardly toward said flange of said base; and a drain trough having an upstanding rear splash flange insertable under said flange of said base where grease and debris reaching said flange of said base drains into said trough.

2. In the combination structure selectively supporting a broiler and griddle of claim 1 wherein said base nestably and selectively, upon removal of said broiler, receives a one-piece griddle element having a depending flange across the front thereof and which rests on said downward flange on said base and is slanted by said base to drain on said lip and into said drain trough.

3. In the combination of claim 1 wherein said broiler surface formed by said spaced-apart smaller angles has openings of about three-eighth inches between said legs of adjacent of said angles.

4. In the combination of claim 3 wherein the elongate smaller angles forming said broiler surface have said legs thereof about one-half inch wide.

* * * * *